(12) United States Patent
Mine

(10) Patent No.: US 7,344,310 B2
(45) Date of Patent: Mar. 18, 2008

(54) LINEAR MOTION GUIDE UNIT

(75) Inventor: Akitomo Mine, Tokyo (JP)

(73) Assignee: Nippon Thompson Co., Ltd., Tokyo (JP)

( * ) Notice: Subject to any disclaimer, the term of this patent is extended or adjusted under 35 U.S.C. 154(b) by 643 days.

(21) Appl. No.: 10/910,370

(22) Filed: Aug. 4, 2004

(65) Prior Publication Data

US 2005/0029211 A1 Feb. 10, 2005

(30) Foreign Application Priority Data

Aug. 7, 2003 (JP) .............................. 2003-288898

(51) Int. Cl.
*F16C 29/04* (2006.01)
*A47B 88/00* (2006.01)
(52) U.S. Cl. .......................................... 384/49; 384/21
(58) Field of Classification Search ................. 384/43, 384/45, 49, 21
See application file for complete search history.

(56) References Cited

U.S. PATENT DOCUMENTS

| | | | | |
|---|---|---|---|---|
| 4,655,613 A | * | 4/1987 | Yokota | 384/49 |
| 4,701,058 A | * | 10/1987 | Mottate | 384/45 |
| 4,986,508 A | * | 1/1991 | Osawa et al. | 248/300 |
| 5,088,839 A | * | 2/1992 | Tsukada | 384/45 |
| 5,213,419 A | * | 5/1993 | Geka | 384/49 |
| 5,213,420 A | * | 5/1993 | Agari | 384/49 |
| 5,672,010 A | * | 9/1997 | MacNicol et al. | 384/42 |
| 6,145,945 A | * | 11/2000 | Parvin | 312/334.46 |
| 6,296,413 B1 | * | 10/2001 | McCann et al. | 403/51 |
| 6,513,976 B2 | * | 2/2003 | Maiss et al. | 384/15 |

FOREIGN PATENT DOCUMENTS

JP      2000-27860      1/2000

* cited by examiner

*Primary Examiner*—Thomas R. Hannon
*Assistant Examiner*—Justin Krause
(74) *Attorney, Agent, or Firm*—Browdy and Neimark, PLLC

(57) ABSTRACT

A linear motion guide unit has a stopper plug that is first set on any one of the forward and aft ends of the guide rail in place and then fastened to the guide rail against turning around its own lengthwise direction by using just one screw. The stopper plug has horn-like projections at areas corresponding to the raceway grooves on the guide rail, the horn-like projections spreading sidewise beyond contour of the guide rail. The horn-like projections are made with raised portions. Upon movement of the slider relatively to the guide rail, the retainer collides at forward and aft ends thereof against the raised portions of the stopper plugs, which fit in the raceway grooves on the guide rail, to keep the retainer against escape out of the guide rail.

9 Claims, 6 Drawing Sheets

LINEAR MOTION GUIDE UNIT

FIELD OF THE INVENTION

The present invention relates to a linear motion guide unit, which is comprised of a guide rail, a slider fitted over the guide rail to move relatively to the guide rail by virtue of more than one rolling element that is installed for rolling movement in a race defined between the guide rail and the slider, and a retainer used to space the rolling elements from each other.

BACKGROUND OF THE INVENTION

There are conventionally well known linear motion guide units of the type hereinafter referred to as "finite linear motion guide unit" because of their construction where rolling elements are allowed to roll over only a definite travel instead of rolling through a recirculation circuit. Most of the finite linear motion guide units have retainers or cages to space rolling elements from each other, which are allowed to run through a race provided between a guide rail and a slider. With the finite linear motion guide units of the sort described earlier, moreover, stopper plugs are usually provided at forward and aft ends of the guide rail, one to each end, to keep the retainer against from escape out of the associated guide rail. In terms of fastening construction of the stopper plugs to their associated ends of the guide rail, there has been already known the stopper construction making it possible to secure the stopper plug to the associated end of the guide rail by using just one fastener screw in a way kept against turning around its own axis, thereby rendering the fastening of the stopper plug to the guide rail simpler in construction.

The finite linear motion guide unit of the sort as constructed as stated earlier is disclosed in, for example Japanese Patent Laid-Open No. 2000-27860. The prior finite linear motion guide unit, as shown in FIG.18, is made up of an elongated guide rail 52 having widthwise opposite sides on which are made lengthwise raceway grooves 54, one to each side, a slider 51 made to fit over and conform to the guide rail 52 and have raceway grooves 53 in opposition to the raceway grooves 54 on the guide rail 52, and a retainer 59 made with more than one pocket 62 to accommodate therein more than one rolling element 55, one to each pocket, which is allowed to roll through a race defined between the confronting guide rail 52 and slider 51. A stopper plug 57 is secured to any one end 61 of the guide rail 52 with using just one screw 63. The stopper plug 57 is so made as to allow the slider 51 passing over there without running into any interference with an end plate 56 mounted with screws 58 to any one end of the slider 51, which moves relatively to the guide rail 52. The stopper plug 57, moreover, has projections 60 extending sidewise out of widthwise corners thereof so as to come into engagement with the retainer 59 thereby keeping the retainer 59 against falling away out of the linear motion guide unit. The projections 60 are angled slightly together with their associated corners of the stopper plug 57 towards the sides of the guide rail 52 to come into engagement with the sidewise edges on the end face of the guide rail 52, keeping the stopper plug 57 against turning on a lengthwise direction of the guide rail 52.

With the prior finite linear motion guide unit constructed as stated earlier, the stopper plug 57 has sidewise projections 60, which lean back slightly towards the associated end 61 of the guide rail 52. This slightly askew construction of the projection 60 works well enough to keep the stopper plug 57 against turning or angular shift on the lengthwise direction of the guide rail 52, even with just one fastening screw 58. The stopper plug 57, moreover, is made to have restoration from the deformation caused by tightening of the fastening screw 58, thereby preventing loosening or unscrewing of the fastening screw 58. The conventional finite linear motion guide unit of the construction as stated just earlier, nevertheless, has needed several more chores to fit accurately the tiny stopper plug 57 onto the end face of the guide rail 52 to meet a growing demand for shrinking the linear motion guide unit down. Moreover, accurately bending the stopper plug 57 to provide the sidewise projections 60 has been proved to be difficult and complex.

SUMMARY OF THE INVENTION

The present invention, therefore, has as its primary object to solve the major challenge as described just above in the conventional linear motion guide units and more particular to provide a linear motion guide unit in which a stopper plug can be set more simple in place and more easily fit onto a guide rail with accuracy and end plates on forward and aft ends of a slider may get as closer as possible to an upper surface of the guide rail to serve a dust tight function while both the stopper plug and the end plate in combination keep the retainer against escape out of the slider and/or the guide rail.

The present invention is concerned with a linear motion guide unit comprising; a guide rail having widthwise opposing sides on which lengthwise raceway grooves are made, one to each side, a slider fit over the guide rail for linear movement relative to the guide rail, the slider being provided with raceway grooves that are in opposition to the raceway grooves on the guide rail, a retainer used to space more than one rolling element from each other, which rolls through a race defined between the raceway groove on the guide rail and the raceway groove in the slider, and a stopper plug fastened to any one of forward and aft end of the guide rail;

wherein the stopper plug has horn-like projections at areas corresponding to the raceway grooves on the guide rail, the horn-like projections spreading sidewise beyond contour of the guide rail, the horn-like projections being made in a configuration that causes no interference with the slider upon linear movement of the slider relative to the guide rail, and the horn-like projections being made with raised portions that are adapted to fit into the raceway grooves on the guide rail to keep the stopper plug in place relative to the guide rail, whereby upon movement of the slider relatively to the guide rail, the retainer collides at forward and aft ends thereof against the raised portions of the stopper plugs, which fit in the raceway grooves on the guide rail, to keep the retainer against escape out of the guide rail.

In one aspect of the present invention, there is disclosed a linear motion guide unit in which the stopper plug is fastened to any one of the forward and aft ends of the guide rail in a way kept against turning around a lengthwise direction of the guide rail by using just one screw, with the raised portions on the horn-like projections of the stopper plug being fit in their associated raceway grooves of the guide rail.

In another aspect of the present invention, there is disclosed a linear motion guide unit in which the rolling element is a ball while the raceway grooves on the guide rail are each made circular in transverse section in conformity with the ball and the raised portions corresponding to the raceway grooves on the guide rail are each made circular to fit into their associated grooves on the guide rail.

In another aspect of the present invention, there is disclosed a linear motion guide unit in which the retainer fits in a clearance between the guide rail and the slider, the retainer being formed into an inverted U-shape in transverse section, which is composed of widthwise opposing side webs extending lengthwise along the sides of the guide rail, one to each side, and a ceiling web joining together the side webs with one another, and wherein the side webs of the retainer are each made therein with more than one pocket where the rolling element may fit, one to each pocket, in opposition to the raceway grooves of the slider.

In a further another aspect of the present invention, there is disclosed a linear motion guide unit in which the retainer comes into collision at the forward and aft ends of the side webs thereof against the raised portions on the horn-like projections of the stopper plug, whereby the retainer is prevented from falling away out of the guide rail.

In another aspect of the present invention, there is disclosed a linear motion guide unit in which the stopper plug is made of a sheet stock and the raised portions are formed by forcing the horn-like projections to make an offset potion where any one surface is recessed while another surface is complementarily raised. As an alternative, the raised portions are formed above any one surface of the horn-like projections of the stopper plug.

In another aspect of the present invention, there is disclosed a linear motion guide unit in which the slider is jointed to any object including machine bed, other devices, and so on while fits over the guide rail for sliding movement relative to each other, with undergoing any prestressed condition through the rolling elements.

In another aspect of the present invention, there is disclosed a linear motion guide unit in which an end plate secured to any one of forward and aft ends of the slider is formed in an inverted U-shape in transverse section, which includes wing areas made extended along the sides of the guide rail, and an upper area to join together the wing areas, the wing areas of the end plate being made in a configuration conforming to wings of the slider that fits over the guide rail, and the upper area of the end plate being made to have a lower edge hugging an upper surface of the guide rail.

In a further another aspect of the present invention, there is disclosed a linear motion guide unit in which the lower edge of the end plate serves to prevent any foreign matter from entering into the slider as well as any contaminant from leakage out of the slider through a clearance between the slider and the guide rail, and wherein the retainer during reciprocating movement of the slider relative to the guide rail is kept against escape out of the slider by coming into collision against the back of the lower edge at any one of forward and aft ends of the ceiling web.

In a further another aspect of the present invention, there is disclosed a linear motion guide unit in which the retainer during reciprocating movement of the slider relatively to the guide rail comes into collision at the forward and aft ends thereof against the raised portions of the stopper plugs secured to the guide rail and/or the end plates attached to the slider, whereby the retainer is prevented from falling away from the linear motion guide unit.

The linear motion guide unit constructed as stated earlier according to the present invention is envisaged to more improve the conventional linear motion guide unit of the sort referred to as finite linear motion guide unit. To this end, the stopper plug to be secured to any one of the forward and aft ends of the guide rail has the widthwise opposing horn-like projections on which the raised portions are made to fit into the raceway grooves of the guide rail, making it easy and simple to set the stopper plug in place with accuracy on the associated end of the guide rail. Fit of the raised portions of the stopper plug into the raceway grooves on the guide rail helps make sure of fastening the stopper plug with ease and accuracy to the guide rail in a way keeping the stopper plug against turning around the lengthwise direction of the guide rail by using just one screw. Upon movement of the slider relatively to the guide rail, the retainer collides at forward and aft ends thereof against the raised portions of the stopper plugs, which fit in the raceway grooves on the guide rail, to keep the retainer against escape out of the guide rail. With the linear motion guide unit constructed as stated just above, moreover, an end plate is secured to any one of forward and aft ends of the slider. The end plate is made to have a lower edge hugging an upper surface of the guide rail. Thus, the lower edge of the end plate serves to prevent any foreign matter from entering into the slider as well as any contaminant from leakage out of the slider through a clearance between the slider and the guide rail. The retainer during reciprocating movement of the slider relative to the guide rail is also kept against escape out of the slider by coming into collision against the back of the lower edge at any one of forward and aft ends thereof.

DETAILED DESCRIPTION OF THE PREFERRED EMBODIMENTS

A preferred embodiment of a linear motion guide unit according to the present invention will be explained hereinafter in detail with reference to the accompanying drawings. The linear motion guide unit of the present invention is envisaged to use it in sliding parts incorporated in various machines and devices including, for example, semiconductor manufacturing equipment, precision measuring/inspection instruments, precision assembling machines, medical engineering instruments, and so on.

Figure 1:
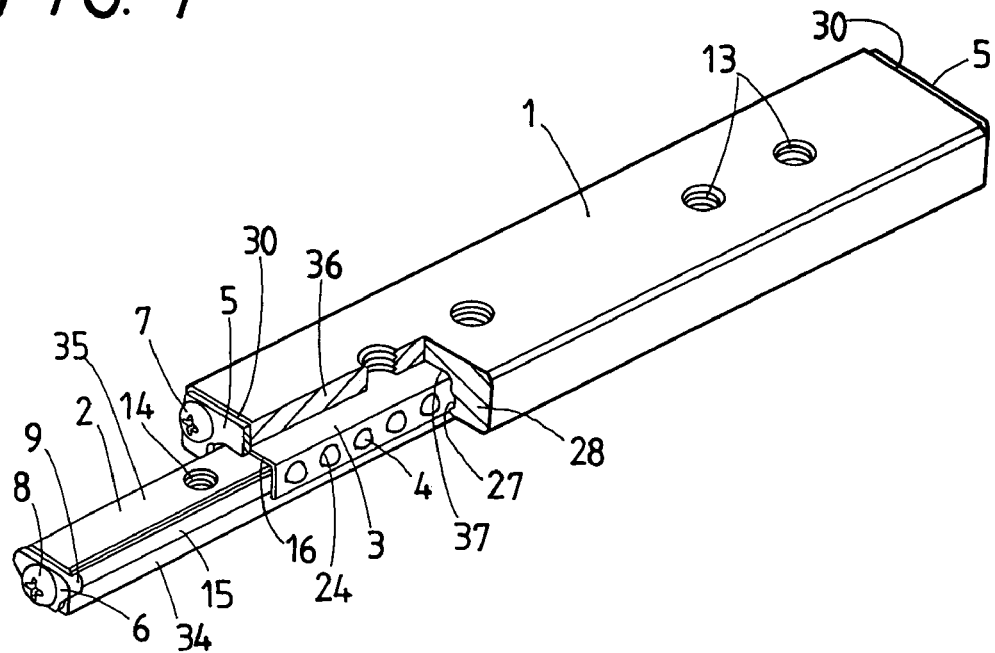
FIG. 1 is a perspective view, partially broken away, showing a preferred embodiment of a linear motion guide unit in accordance with the present invention.
Figure 18:
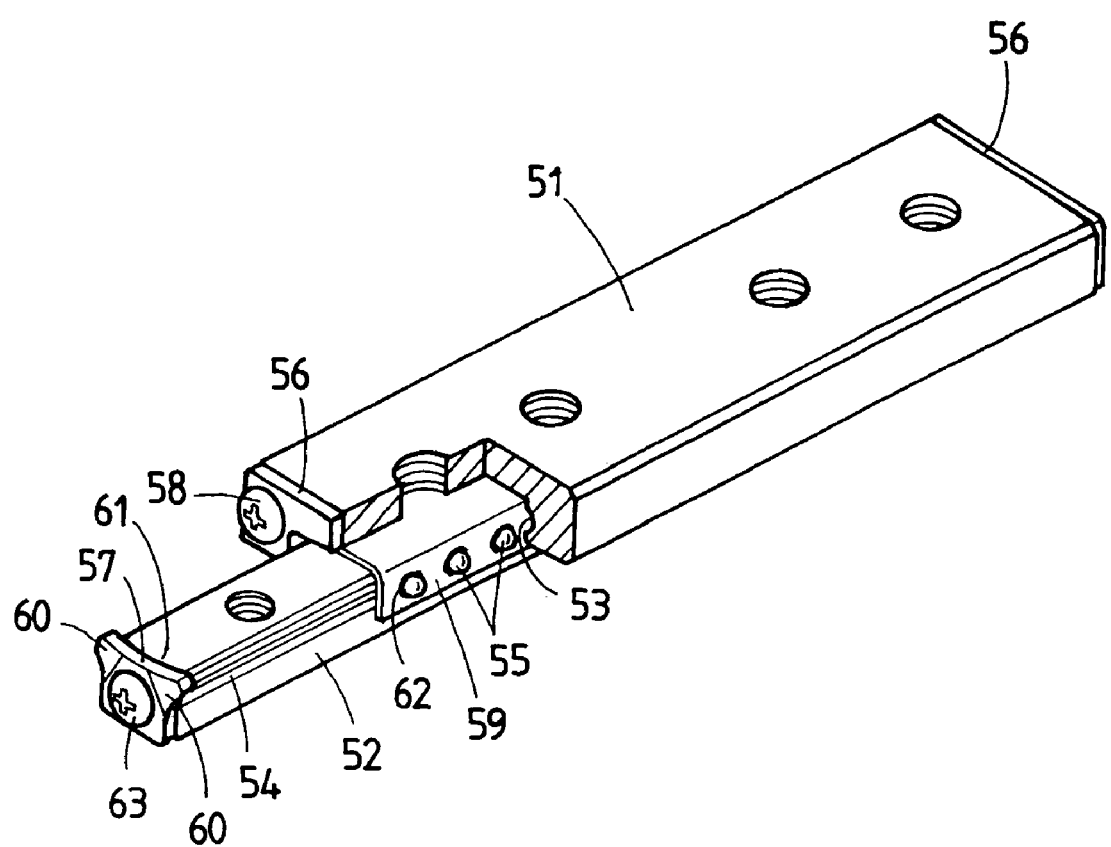
FIG. 18 is a partially cutaway view in perspective of a conventional finite linear motion guide unit.

The linear motion guide unit of the present invention in FIG. 1, as with the conventional linear motion guide unit shown in FIG. 18, is comprised of an elongated guide rail 2 having widthwise opposite sides 34 where raceway grooves 15 are cut extending lengthwise of the guide rail 2, one to each side, a slider 1 made recessed at 37 to fit over and conform to the guide rail 2, the slider being also cut to provide raceway grooves 27 extending in opposition to the raceway grooves 15 on the guide rail 2, and a retainer 3 keeping therein more than one rolling element 4 of ball, which is allowed to roll through a race defined between the confronting raceway grooves 15 and 27. The slider 1 forms an inverted U-shape in transverse section, which is made up of wings 28 lying on opposite sides of the guide rail 2 in a way extending along the lengthwise sides 34 of the guide rail 2, one to each side, and a bridge 36 connecting the wings 28 to one another to form the recess 37 between them. Thus, the slider 1 is allowed to fit over the guide rail 1 at its recess 37. The slider 1 is made on an upper surface thereof with tapped holes 13, which are used to fasten thereto any object, not shown, including a machine bed, other various instruments, and so on. The wings 28 of the slider 1 is made with the raceway grooves 27, which are in opposition to the raceway grooves 15 on the guide rail 2. The guide rail 2 is also made on an upper surface 35 thereof with tapped holes 14, which are used to fasten thereto any object, not shown, including a machine bed, other various instruments, and so on.

Figure 2:
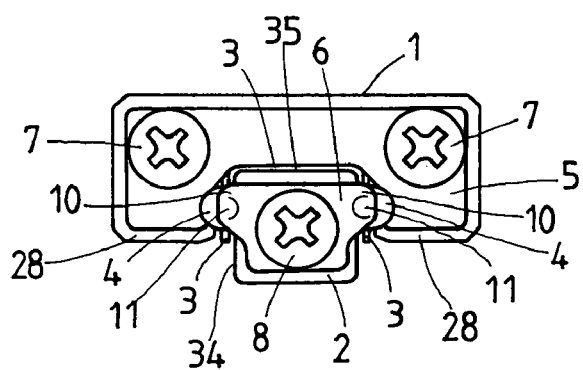
FIG. 2 is a front elevation of the linear motion guide unit of FIG. 1.
Figure 3:
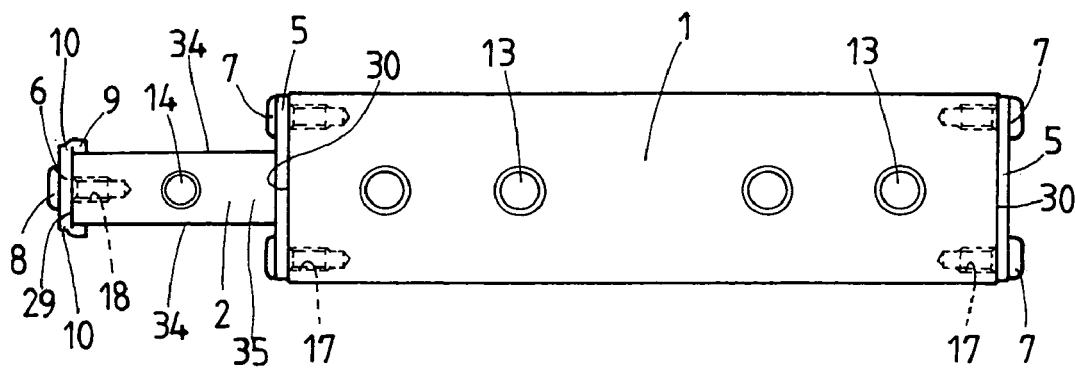
FIG. 3 is a top plan view of the linear motion guide unit shown in FIG. 1.

With the linear motion guide unit according to the embodiment shown in FIGS. 1 to 3, the slider 1 is made substantially equal in overall length with the guide rail 2 while the retainer 3 is made less in length than both the slider 1 and the guide rail 2. A limited travel or a stroke in sliding movement of the slider 1 relative to the guide rail 2 is determined to, for example a specific length substantially twice as long as a difference in length between the slider 1 and the retainer 3. In FIG. 1, the slider 1 is shown in a phase moved rightwards relative to the guide rail 2. The slider 1, although fitted over the guide rail 2 for traveling relative to each other by virtue of the rolling elements 4, is assembled to the guide rail 2 through the rolling elements 4 with a fit that has zero or negative allowance, in other words, under a prestressed condition. This construction makes sure of smooth movement of the slider 1 over the guide rail 2 without getting jarred. With the linear motion guide unit constructed as stated earlier, when the slider 1 is jointed to any object including machine bed, other devices, and so on using screws driven into the tapped holes 13, the slider 1 would fit over the guide rail 2 for sliding movement relative to each other, with undergoing any prestressed condition through the rolling elements 4.

The linear motion guide unit of the present invention, especially, has a construction that is envisaged to prevent the retainer 3 from falling away or escape out of the guide rail 2 and/or the slider 1 during the sliding movement of the slider 1 and the guide rail 2 relatively to one another. This anti-escape construction has a stopper plug 6 shown in FIGS. 4 to 10 or a modified stopper plug 6A shown later in FIGS. 11 and 12, both being fastened to forward and aft ends 29 of the guide rail 2, and an end plate 5 to be secured to forward and aft end surfaces 30 of the slider 1, the end plate 5 being made of a sheet member having a configuration just barely smaller than the contours of the forward and aft end surfaces 30 of the slider 1, except a lower edge 21. The end plate 5 is recessed inwards at 20, likewise the recess 37 in the slider 1, to fit over and conform to the guide rail 2. Either of the stopper plugs 6, 6A is designed to pass through the recess 37 in the slider 1 without making any engagement or interference with the slider 1.

Figure 15:
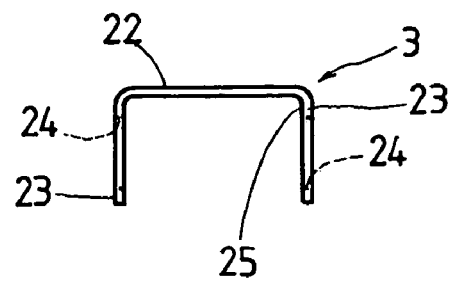
FIG. 15 is front elevation of a retainer in the linear motion guide unit of FIG. 1.
Figure 16:
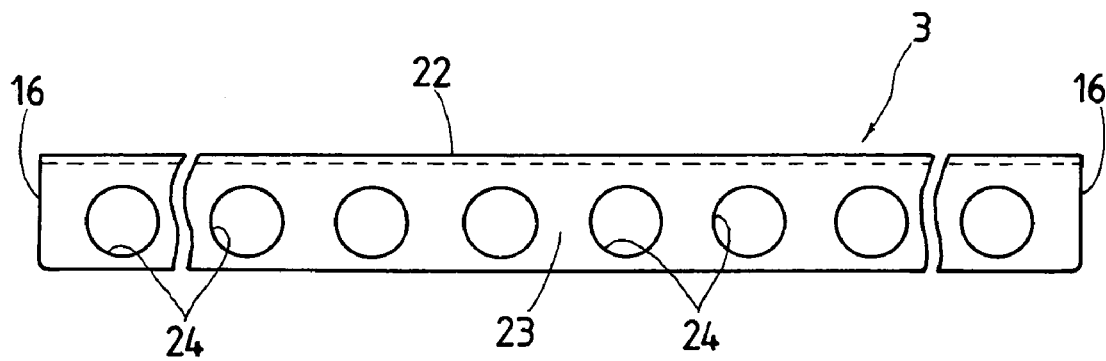
FIG. 16 is a side elevation, partially broken away, showing the retainer of FIG. 15.
Figure 17:
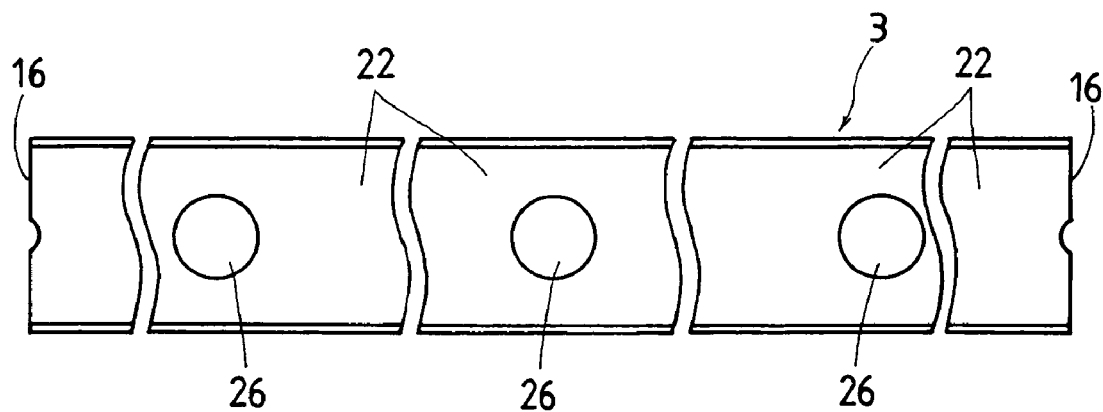
FIG. 17 is a bottom view, partially broken away, of the retainer of FIG. 15: and 1

The retainer 3, as shown in FIGS. 15 to 17, is made of a sheet member formed into an inverted U-shape in transverse section, which consists of widthwise opposing side webs 23 extending lengthwise along the sides of the guide rail 2, one to each side, and a ceiling web 22 joining together the side webs 23 with one another. The side webs 23 of the retainer 3 are each made therein with some pockets 24 where the rolling elements 4 may fit, one to each pocket, in opposition to the raceway grooves 27 of the slider 1. The ceiling web 22 is made therein with more than one hole that serves as positioning means. The guide rail 2 is snugly nested in a recess 25 defined in the inverted U-shape in transverse section, so that the retainer 3 is allowed to fit in a clearance left between the slider 1 and the guide rail 2 while keeping the rolling elements 4 in place along the race defined between the raceway groove 15 on the guide rail 2 and the raceway groove 27 in the slider 1. The retainer 3 is used to lengthwise space the rolling elements 4 from each other. To this end, the retainer 3 according to the embodiment discussed now is made with circular pockets 24 that are positioned at regular intervals in longitudinal direction of the retainer 3.

Figure 13:
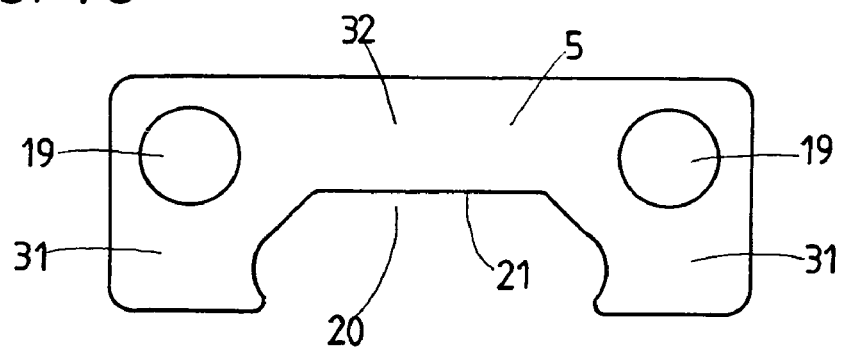
FIG. 13 is a front elevation of an end plate to be fastened to a slider assembled in the linear motion guide unit of FIG. 1.
Figure 14:
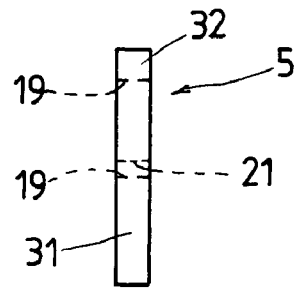
FIG. 14 is a side elevation of the end plate of FIG. 13.

With the linear motion guide unit constructed as stated earlier, the end plate 5 secured to the slider 1, as shown in FIGS. 13 and 14, is formed in an inverted U-shape in transverse section, which includes wing areas 31 made extended along the sides 34 of the guide rail 2, and an upper area 32 to join together the wing areas 31. The end plate 5 is made with holes 19 at the sidewise opposing wing areas 31, one to each wing area, in alignment with tapped holes 17 opened in forward and aft end surfaces 30 of the slider 1 at areas that would come into engagement with the wing areas 31 of the end plates 5. Thus, fastening screws 7, as shown in FIGS. 1 to 3, are allowed to extend through holes 19 in the end plates 5, followed by mating with the associated tapped holes 17 to fasten the end plates 5 to the forward and aft end surfaces 30 of the slider 1, one to each end surface. The wing areas 31 of the end plate 5 is made in the configuration conforming to the wings 28 of the slider 1 that fits over the guide rail 2, while the upper area 32 of the end plate 5 is made to have a lower edge 21 hugging the upper surface 35 of the guide rail 2. The lower edge 21 of the end plate 5 serves to prevent any foreign matter from entering through a clearance between the slider 1 and the guide rail 2. Moreover, the retainer 3 during reciprocating movement of the slider 1 relative to the guide rail 2 is kept against escape out of the linear motion guide unit or the slider 1 by coming into abutment against the back of the lower edge 21 at any one of forward and aft ends 16 of the ceiling web 22. The end plate 5 is designed to make the clearance above the upper surface 35 of the guide rail 2 less as close as possible, serving dustproof sealing functions including preventing any dust and dirt from entering inside the slider 1, and keeping waste material such as small chips, dust, debris, grease, and so on against oozing out of the slider 1. It is to be understood that the end plate 5 should not be limited in shape to FIG. 13 so long as it may serve both the stopper functioning for the retainer 3 and the sealing functioning for the clearance above the guide rail 2.

Figure 4:
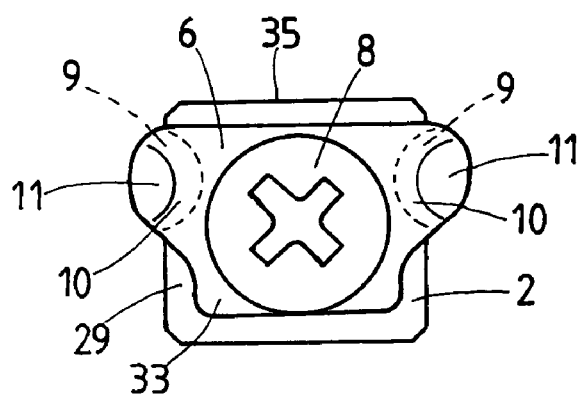
FIG. 4 is a front elevation of a guide rail on which a stopper plug is fastened in the linear motion guide unit of FIG. 1.

Stoppers plugs 6, as shown in FIGS. 1 to 6, are secured to forward and aft ends 29 of the guide rail 2 that are made on widthwise opposing sides thereof with lengthwise raceway grooves 15. The stopper plug 6, as shown in for example FIGS. 2 and 4, is made in a horned shape where there are provided horn-like projections 10 extending sidewise beyond the contour of the guide rail 2 of nearly rectangle in transverse section thereof. The horn-like projection 10 is made somewhat less than or reaches less than the radial contour of the rolling element fit in the associated raceway groove 27. The horn-like projection 10 is also made circular at its outer surface in conformity with a ball for the rolling element 4. The slider 1, upon moving relatively to the guide rail 2, is allowed to make reciprocating movement smoothly without causing any interference with the stopper plugs 6.

With the linear motion guide unit of the present invention, especially, the horn-like projections 10 of the stopper plug 6 has raised portions 9 that are provided to fit in the raceway grooves 15 on the guide rail 2 to set the stopper plug 6 in place. Upon movement of the slider 1 relatively to the guide rail 2, the retainer 3 collides at the forward and aft ends 16 thereof against the raised portions 9 of the stopper plugs 6, which fit in the raceway grooves 15 to keep the retainer 3 against escape out of the guide rail 2. The stopper plugs 6 are fastened to the forward and aft ends 29 of the guide rail 2 against turning around the lengthwise direction of the guide rail by using just one screw 8, with their raised portions 9 being fit in the associated raceway grooves 15 of the guide rail 2.

With the linear motion guide unit constructed as stated earlier, while the raceway grooves 15 cut in the guide rail 2 is made circular in transverse section, the raised portions 9 of the stopper plugs 6 to fit into the associated raceway grooves 15 are each made circular in conformity to the curved surface of the raceway groove 15 on the guide rail 2. On fastening the stopper plugs 6 to the guide rail 2, the raised portions 9 on the horn-like projections 10 can fit snugly in the raceway groove 15 of the guide rail 2 with accuracy, thereby making certain of very easy assembly of the stopper plugs 6 with the guide rail 2. After the stopper plugs 6 are fastened to the forward and aft ends 29 of the guide rail 2, the raised portions 9 can collide against the forward and aft ends 16 of the retainer 3, preventing the retainer 3 from runaway out of the guide rail 3. The horn-like projections 10 inclusive of the raised portions 9 are made to have the overall geometry including the circular surface, which causes no interference with raceway grooves 27 opened to the recess 37 in the slider 1. This construction makes certain that the slider 1 moves without subjected to any obstacle that might be caused by the stopper plugs 6 fastened to the guide rail 2.

The recess 20 made in the end plate 5 is spaced out sidewise at areas confronting the raceway grooves 27 on the guide rail 2 to allow the horn-like projections 10 of the stopper plugs 6 to move across the end plate 5. The lower edge 21 of the end plate 5 opposing to the upper surface 35 of the guide rail 2 does not reach or touch the guide rail 2, but makes the clearance above the upper surface 35 of the guide rail 2 less as close as possible, serving dustproof sealing functions including preventing any dust and dirt from entering inside the slider 1, and keeping waste material such as small chips, debris, grease against oozing out of the slider 1. The lower edge 21 of the end plate 5, moreover, serves as a surface of reference to mount the end plates 5 on the forward and aft ends of the slider 2.

Figure 5:
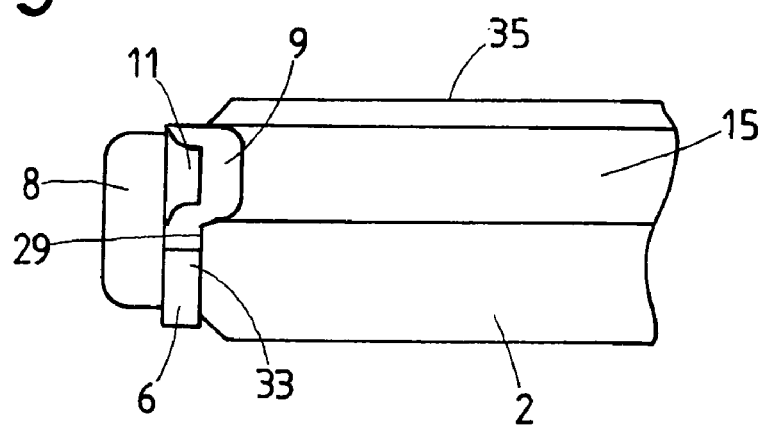
FIG. 5 is a fragmentary side elevation of the guide rail of FIG. 4 where a stopper plug is shown fastened thereto.
Figure 6:
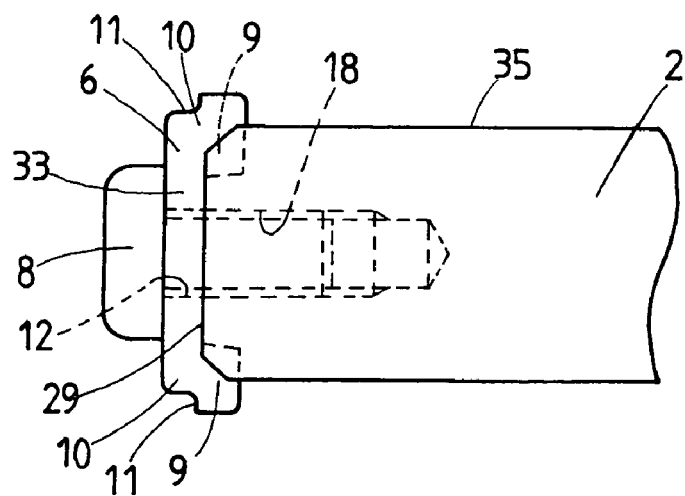
FIG. 6 is a fragmentary top plan view of the guide rail of FIG. 5 where a stopper plug is shown fastened thereto.
Figure 7:
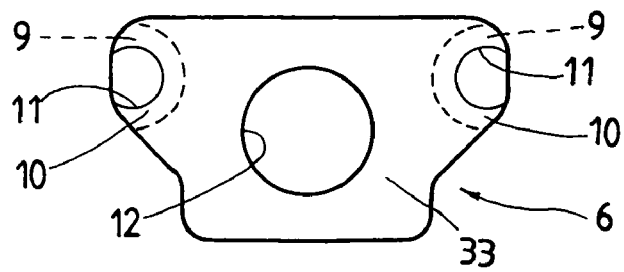
FIG. 7 is a front elevation showing the stopper plug of FIG. 4.
Figure 8:
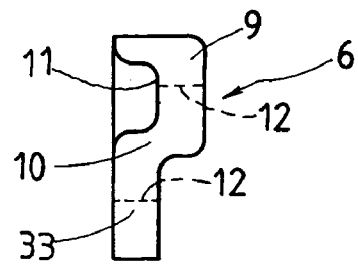
FIG. 8 is a side view of the stopper plug of FIG. 7.

The stopper plug 6 except the horn-like projections 10 is made just smaller in size than the contours of the guide rail 2. As shown in FIGS. 3, 5 and 6, the stopper plug 6 is offset backwards at the horn-like projections 10 to provide the raised portions 9, which is adapted to fit into the raceway grooves 15 of the guide rail 2 to fasten the stopper plug 6 to the guide rail 2. The stopper plug 6, as being held on the guide rail 2 with the raised portions 9 fitting in the raceway grooves 15 of the guide rail 2, can be fastened to any of the forward and aft ends 29 of the guide rail 2 by using just one screw 8 in a way kept against turning around its own axial direction relatively to the guide rail 2.

With the linear motion guide unit constructed as stated earlier, the retainer 3 during reciprocating movement of the slider 1 relatively to the guide rail 2 comes into collision at the forward and aft ends 16 thereof against the raised portions 9 of the stopper plugs 6 secured to the guide rail 2 and/or the end plates 5 attached to the slider 1, whereby the retainer 3 is prevented from falling away from the linear motion guide unit.

Figure 9:
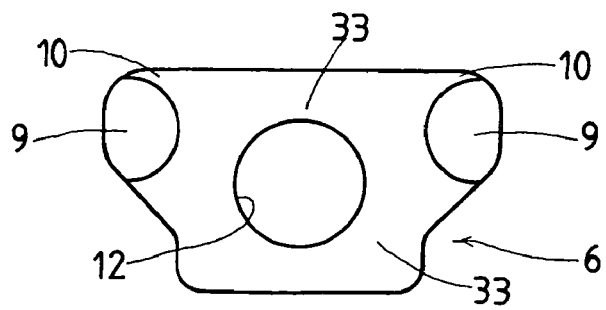
FIG. 9 is a rear elevation of the stopper plug shown in FIG. 7.
Figure 10:
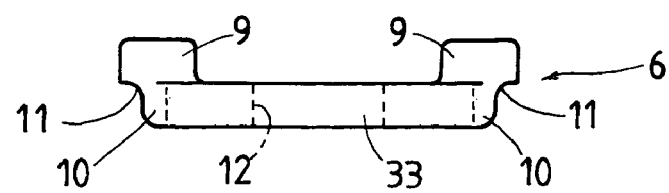
FIG. 10 is a top plan view of the stopper plug shown in FIG. 7.

The stopper plug 6 according to the first embodiment of the present invention is made as shown in FIGS. 4 to 10. The stopper plug 6, as in FIGS. 4 to 6, has the horn-like projections 10 where the raised portions 9 are offset backwards to conform to the raceway grooves 27 that are in opposition to the raceway grooves 15 on the guide rail 2. The stopper plug 6 includes a major portion 33, horn-like projections 10 spreading sidewise from the major portions 33, and raised portions 9 above any one surface of the horn-like projections 10 along the raceway grooves 15 of the guide rail 2. The stopper plug 6 is first held in place on the associated end 29 of the guide rail 2 with the raised portions 9 fitting in the raceway grooves 15 of the guide rail 2, followed by fastened to the guide rail 2 by using just one screw 8 in a way kept against turning around the lengthwise direction of the guide rail 2. Thus, the stopper plug 6 can be set easily in place. Moreover, the stopper plug 6 may be produced with ease by drawing operations that form sheet stock into three-dimensional shapes. The raised portion 9 on the horn-like projection 10 of the stopper plug 6 as in FIGS. 7 to 10 is formed by forcing the horn-like projection 10 to make an offset potion where any one surface is recessed at 11 while another surface is complementarily raised at 9. The raised portion 9, as shown in FIG. 9, is made circular in conformity with the associated raceway groove 27 that is made circular to allow the rolling element 4 of ball to roll through there. With the stopper plug 6 constructed as stated earlier, that is to say, the stopper plug 6 has the horn-like projections 10 spreading sidewise at the areas corresponding to the raceway grooves 15 of the guide rail 2. The horn-like projections 10 are each made somewhat less than or reaches less than the radial contours of the rolling element fit in the associated raceway groove 27. The horn-like projection 10 is also made circular in conformity with the rolling element 4 of ball. The stopper plug 6 except the horn-like projections 10 is made just smaller in size than the contours of the guide rail 2. Moreover, the stopper plug 6 has a bolt hole 18 midway between the horn-like projections 10. Thus, the stopper plug 6 is fastened to the end 29 of the guide rail 2 by using the fastening screw 8 that extends through the bolt hole 18, followed by driving into a threaded hole 18 made in the associated end 29 of the guide rail 2.

Figure 11:
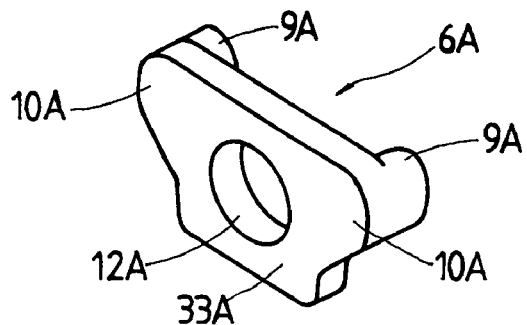
FIG. 11 is a perspective view showing a stopper plug according to another embodiment in the linear motion guide unit of the present invention.
Figure 12:
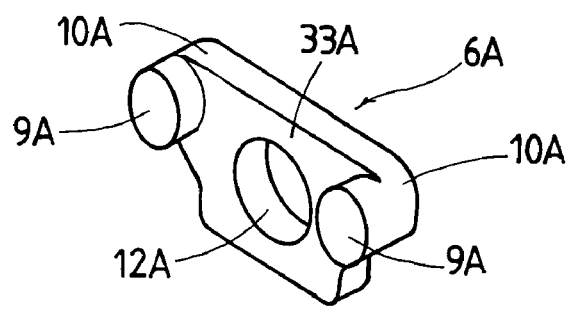
FIG. 12 is a perspective view of the stopper plug of FIG. 11, the view being seen from rear side thereof.

A modified stopper plug 6A according to the second embodiment of the present invention is made as shown in FIGS. 11 and 12. This stopper plug 6A is formed with any casing or molding such as precision-casing process, instead of the drawing operation. The version 6A has horn-like projections 10A each of which has a raised portion 9A on any one surface thereof but no need of recess on another surface thereof. The modified stopper plug 6A includes a major portion 33A, horn-like projections 10A spreading sidewise from the major portions 33A, and raised portions 9A above any one surface of the horn-like projections 10A along the raceway grooves 15 of the guide rail 2. The modified stopper plug 6A has a bolt hole 12A midway between the sidewise opposing raised portions 9A. Thus, the modified stopper plug 6A is fastened to the end 29 of the guide rail 2 by using the fastening screw 8 that extends through the bolt hole 12A, followed by driving into a threaded hole 18 made in the associated end 29 of the guide rail 2. The modification 6A, likewise the stopper plug 6 of the first embodiment, is first held in place on the associated end 29 of the guide rail 2 with the raised portions 9A fitting in the raceway grooves 15 of the guide rail 2, followed by fastened to the guide rail 2 by using just one screw 8 in a way kept against turning around its own axial direction relatively to the guide rail 2. Thus, the modified stopper plug 6 can be set easily in place.

What is claimed is:

1. A linear motion guide unit comprising: a guide rail having widthwise opposing sides on which lengthwise raceway grooves are made, one to each side, a slider fit over the guide rail for linear movement relative to the guide rail, the slider being provided with raceway grooves that are in opposition to the raceway grooves on the guide rail, a retainer used to space more than one rolling element from each other, which rolls through a race defined between the raceway groove on the guide rail and the raceway groove on the slider, and a stopper plug fastened to any one of forward and aft end of the guide rail;

wherein the stopper plug has horned projections at areas corresponding to the raceway grooves on the guide rail, the horned projections spreading sidewise beyond contour of the guide rail, the horned projections being made in a configuration that causes no interference with the slider upon linear movement of the slider relative to the guide rail, and the horned projections being made with raised portions that are adapted to fit into the raised portions that are adapted to fit into the raceway grooves on the guide rail to keep the stopper plug in place relative to the guide rail, whereby upon movement of the slider relatively to the guide rail, the retainer collides at forward and aft ends thereof against the raised portions of the stopper plugs, which fit in the raceway grooves on the guide rail, to keep the retainer against escape out of the guide rail, and wherein the stopper plug is made of a sheet stock which is formed to product the raised portions, each of which has a horned projection which includes an offset portion having a first surface which is recessed and a second surface on the opposite side of the offset portion which is complementarily raised;

wherein each of the second surfaces is respectively fixed to corresponding surfaces in the raceway grooves on the guide rail.

2. A linear motion guide unit constructed as defined in claim 1 wherein the stopper plug is fastened to any one of the forward and aft ends of the guide rail in a way kept against turning around a lengthwise direction of the guide rail by using just one screw, with the raised portions on the horned projections of the stopper plug being fit in their associated raceway grooves of the guide rail.

3. A linear motion guide unit constructed as defined in claim 1 wherein the rolling element is a ball while the raceway grooves on the guide rail are each made circular in transverse section in conformity with the ball and the raised portions corresponding to the raceway grooves on the guide rail are each made circular to fit into their associated grooves on the guide rail.

4. A linear motion guide unit constructed as defined in claim 1 wherein the retainer fits in a clearance between the guide rail and the slider, the retainer being formed into an inverted U-shape in transverse section, which is composed of widthwise opposing side webs extending lengthwise along the sides of the guide rail, one to each side, and a ceiling web joining together the side webs with one another, and wherein the side webs of the retainer are each made therein with more than one pocket where the rolling element may fit, one to each pocket, in opposition to the raceway grooves of the slider.

5. A linear motion guide unit constructed as defined in claim 4 wherein the retainer comes into collision at the forward and aft ends of the side webs thereof against the raised portions on the horned projections of the stopper plug, whereby the retainer is prevented from falling away out of the guide rail.

6. A linear motion guide unit constructed as defined in claim 4 wherein the slider is jointed to a machine bed while fits over the guide rail for sliding movement relative to each other, with undergoing any prestressed condition through the rolling elements.

7. A linear motion guide unit constructed as defined in claim 1 wherein an end plate secured to any one of forward and aft ends of the slider is formed in an inverted U-shape in transverse section, which includes wing areas made extended along the side of the guide rail, and an upper area to join together the wing areas, the wing areas of the end plate being made in a configuration conforming to wings of the slider that fits over the guide rail, and the upper area of the end plate being made to have a lower edge hugging an upper surface of the guide rail.

8. A linear motion guide unit constructed as defined in claim 7 wherein the lower edge of the end plate serves to prevent any foreign matter from entering into the slider as well as any contaminant from leakage out of the slider through a clearance between the slider and the guide rail, and wherein the retainer during reciprocating movement of the slider relative to the guide rail is kept against escape out of the slider by coming into collision against the back of the lower edge at any one of forward and aft ends of the ceiling web.

9. A linear motion guide unit constructed as defined in claim 7 wherein the retainer during reciprocating movement of the slider relatively to the guide rail comes into collision at the forward and aft ends thereof against the raised portions of the stopper plugs secured to the guide rail and/or the end plates attached to the slider, whereby the retainer is prevented from falling away from the linear motion guide unit.

* * * * *